United States Patent
Lin

(10) Patent No.: US 11,431,631 B2
(45) Date of Patent: Aug. 30, 2022

(54) MULTI-ACCESS EDGE COMPUTING DEVICE AND NETWORK ACCESS CONTROL METHOD

(71) Applicant: INDUSTRIAL TECHNOLOGY RESEARCH INSTITUTE, Hsinchu (TW)

(72) Inventor: An-Dee Lin, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 17/129,655

(22) Filed: Dec. 21, 2020

(65) Prior Publication Data

US 2022/0141134 A1    May 5, 2022

(30) Foreign Application Priority Data

Nov. 5, 2020 (TW) .................................. 109138666

(51) Int. Cl.
*H04L 45/745* (2022.01)
*H04W 8/26* (2009.01)

(52) U.S. Cl.
CPC ............. *H04L 45/745* (2013.01); *H04W 8/26* (2013.01)

(58) Field of Classification Search
CPC ............................... H04L 45/745; H04W 8/26
See application file for complete search history.

(56) References Cited

U.S. PATENT DOCUMENTS 10,631,218 B2    4/2020   Baek
10,812,964 B2 *  10/2020  McCann ............... H04W 8/087
(Continued)

FOREIGN PATENT DOCUMENTS

CN    109600802 A    4/2019
WO    2013/000645 A1    1/2013
(Continued)

OTHER PUBLICATIONS

Extended European Search Report dated Jun. 23, 2021 as received in Application No. 21154110.7.
(Continued)

*Primary Examiner* — Saad A. Waqas
(74) *Attorney, Agent, or Firm* — Maschoff Brennan

(57) ABSTRACT

A multi-access edge computing device configured to be connected to first and second networks with different radio access technologies comprises a routing module, a comparison module and a control module. The control module performs steps when determining a user device connected to the first network intends to switch to the second network, wherein the steps comprise: according to identity information of the user device, looking up a target address in a comparison table in the comparison module, notifying the routing module to temporarily store a data packet corresponding to the user device and the first network, notifying the user device to release an original used address on the first network interface and then assigning the target address identical to the original used address to the second network interface of the user device, and transmitting the temporarily stored data packet to the second network interface of the user device.

12 Claims, 10 Drawing Sheets

(56) References Cited

U.S. PATENT DOCUMENTS

| | | | |
|---|---|---|---|
| 2006/0140163 A1* | 6/2006 | He | H04W 60/06 370/338 |
| 2019/0274185 A1 | 9/2019 | Stojanovski | |
| 2020/0076875 A1* | 3/2020 | Sabella | H04L 67/04 |
| 2020/0145432 A1 | 5/2020 | Verma | |

FOREIGN PATENT DOCUMENTS

| | | |
|---|---|---|
| WO | 2015/136240 A1 | 9/2015 |
| WO | 2019/117793 A1 | 6/2019 |
| WO | 2020/013677 A1 | 1/2020 |

OTHER PUBLICATIONS

Taiwan Office Action dated Jul. 12, 2021 as received in application No. 109138666.
Alshalan, "A Survey of Mobile VPN Technologies", 2016.
Subburayalu et al., "Dynamic Load Balancing across Multi-radio Access Bearers in 5G" 2019.
Bojovi'c et al., "IP session continuity in heterogeneous mobile networks using software defined networking" Dec. 2017.
Stöhr et al., "Multi RAT (WiFi/LTE/5G) Mobile Network Featuring RoF Fronthaul, 60 GHz Beam-Switching and Mobile IP" Sep. 2018.
Bukhari e tal., "QoS based approach for LTE-WiFi handover", 2016.
Haddar et al., "Securing Fast PMIPv6 protocol in case of Vertical HandOver in 5G network" 2019.

\* cited by examiner

MULTI-ACCESS EDGE COMPUTING DEVICE AND NETWORK ACCESS CONTROL METHOD

CROSS-REFERENCE TO RELATED APPLICATIONS

This non-provisional application claims priority under 35 U.S.C. § 119(a) on Patent Application No(s). 109138666 filed in Taiwan (ROC) on Nov. 5, 2020, the entire contents of which are hereby incorporated by reference.

BACKGROUND

1. Technical Field

This disclosure relates to a network communication control device, and particularly to a multi-access edge computing (MEC) device.

2. Related Art

With the widespread application of network services, companies increasingly expand their business services to network services. Therefore, currently, in an enterprise private network field, Wi-Fi network has usually been set up, and even a mobile network is introduced, to allow a user device to access the Wi-Fi network and the mobile network which have different radio access technologies (RATs).

Since the Wi-Fi network and the mobile network each have their own methods for assigning IP addresses, and in order to avoid conflicts between the assigned IP addresses, two non-overlapping IP pools are usually configured for the Wi-Fi network and the mobile network. Therefore, when a user device is in the coverage of different RATs while using the network service of the application provided by a company, different IP addresses respectively for RATs are assigned to the user device, and accordingly, the connection of the service must be interrupted.

SUMMARY

According to an embodiment of this disclosure, a multi-access edge computing device is configured to be connected to a first network and a second network that have different radio access technologies, and comprises a routing module, a comparison module and a control module wherein the control module is connected to the routing module and the comparison module. The routing module is configured to temporarily store a data packet. The comparison module stores a user device identity and address comparison table. The control module is configured to perform steps when determining that a user device is connected to the first network and intends to switch to the second network, wherein the steps comprise: according to identity information of the user device, looking up a target address in the user device identity and address comparison table, notifying the routing module to temporarily store a data packet corresponding to the user device and the first network, notifying the user device to release an original used address on an interface of the first network and then assigning the target address to an interface of the second network of the user device, and transmitting the data packet that is temporarily stored to the interface of the second network of the user device. The target address is identical to the original used address.

According to an embodiment of this disclosure, a network access control method is applied to a multi-access edge computing device, wherein the multi-access edge computing device is configured to be connected to a first network and a second network that have different radio access technologies. The network access control method comprises: determining that a user device is connected to the first network and intends to switch to the second network; according to identity information of the user device, looking up a target address in a user device identity and address comparison table, and temporarily storing a data packet corresponding to the user device and the first network; notifying the user device to release an original used address on an interface of the first network and then assigning the target address to an interface of the second network of the user device, wherein the target address is identical to the original used address; and transmitting the data packet that is temporarily stored to the interface of the second network of the user device.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
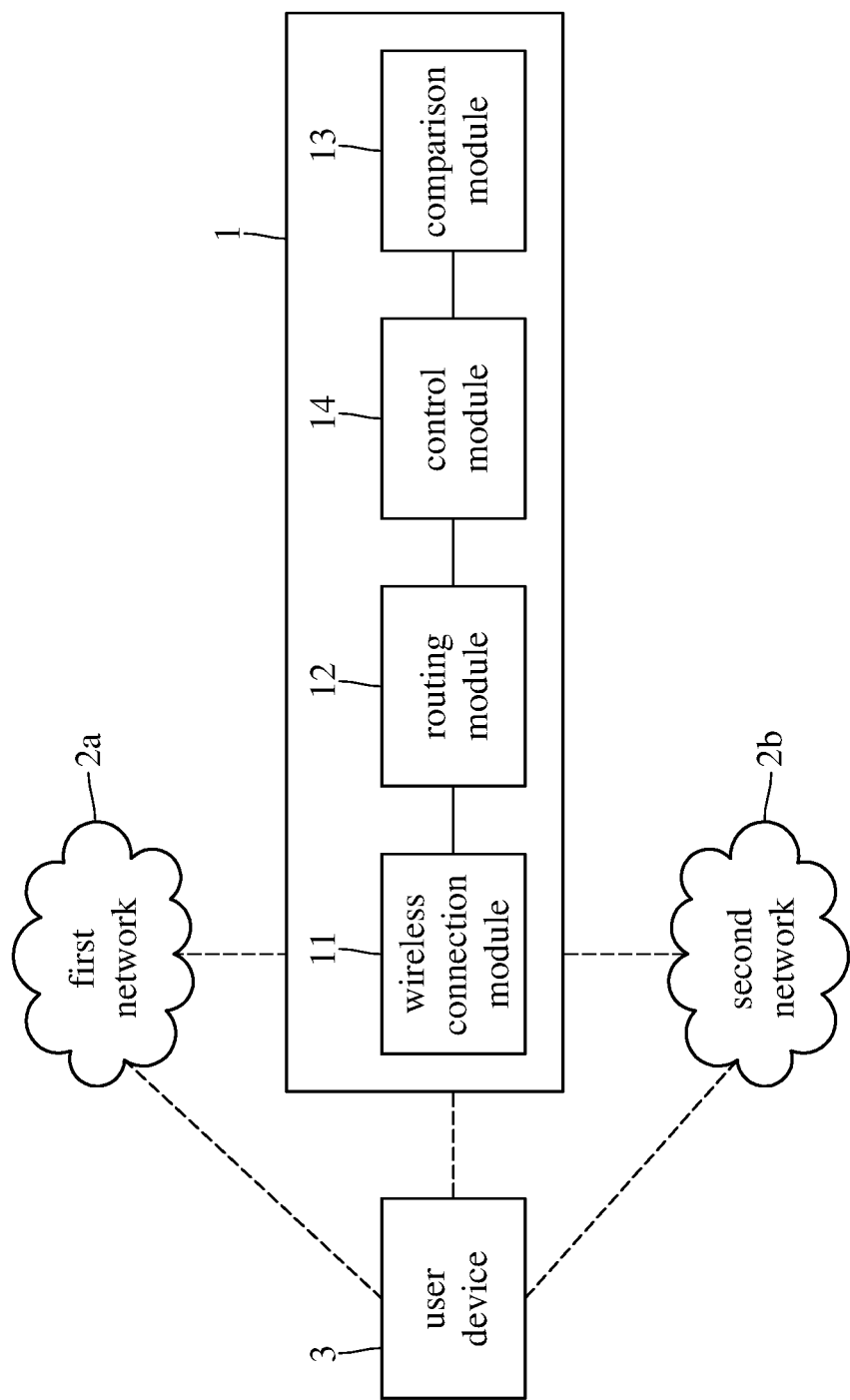
FIG. 1 is a schematic diagram of a communication environment of a multi-access edge computing device according to an embodiment of this disclosure.

This disclosure provides a multi-access edge computing (MEC) device located at the boundary between the access network and the core network, and configured to allow a user device to obtain the same internet protocol (IP) address as originally used after switching the access network. Please refer to FIG. 1, a schematic diagram of a communication environment of a multi-access edge computing device according to an embodiment of this disclosure. As shown in FIG. 1, the multi-access edge computing device 1 can be connected to a first network 2a and a second network 2b, and can be connected to a user device 3. More particularly, the multi-access edge computing device 1 can be connected to the first network 2a, the second network 2b and the user device 3 by a wireless connection module 11. The first network 2a and the second network 2b have different radio access technologies. In other words, the communication environment shown in FIG. 1 belongs to a heterogeneous network. For example, one of the first network 2a and the second network 2b is Wi-Fi network, and the other one is a mobile network that is also called cellular network, such as 4G network, 5G network, etc. The user device 3 is, for example, a mobile electronic device such as smart phone, tablet, laptop, etc., and can be connected to the first network 2a and the second network 2b.

The multi-access edge computing device 1 comprises a persistent IP dispatcher (PIPD) that can manage the assignment of IP addresses in a unified manner. The PIPD comprises a routing module 12, a comparison module 13 and a control module 14, wherein the control module 14 is connected to the routing module 12 and the comparison module 13. The routing module 12 can be connected to a wireless connection module 11 and an APP backend, and execute a routing rule: transmitting a data packet to the destination according to one or more characteristics of the header of the data packet. More particularly, the routing module 12 can transmit data packets from the APP backend to the user device 3 through the first network 2a and the second network 2b by the wireless connection module 11. The routing module 12 can also be controlled by the control module 14 to temporarily store one or more data packets.

The comparison module 13 stores a user device identity and address comparison table. The user device identity and address comparison table stores identity information of user devices and the IP addresses of user devices. For example, the identity information of the user device can be a subscriber permanent identifier (SUPI) or a unique symbol for the user device. More particularly, the comparison module 13 can return the IP address corresponding to the identity information of a specific user device provided by the control module according to the above-mentioned comparison table. If the comparison module 13 determines that this user device has not been assigned a dedicated IP address (e.g. there is no record of this specific user device on the comparison table), the comparison module 13 can select an unused IP address from an IP pool as the dedicated IP address of this specific user device, record the dedicated address and the identity information of this specific user device and their relationship in the comparison table, and return the dedicated IP address to the control module 14. Moreover, when the remaining available capacity (storage space) of the comparison table or the IP pool is less than a preset threshold, the comparison module 13 can clear the records that have not been used for a long time (e.g. the identity information and dedicated IP address of a user device that has not been connected to any RAT for a preset time); or, the comparison module 13 can regularly clear said records that have not been used for a long time.

The control module 14 is configured to perform several steps when determining that the user device 3 that is connected to the first network 2a intends to switch to the second network 2b, and said several steps comprises: according to identity information of the user device 3, looking up a target address in the user device identity and address comparison table, and notifying the routing module 12 to temporarily store one or more data packets corresponding to the user device 3 and the first network 2a; notifying the user device 3 to release an original used address on the interface of the first network 2a, and then assigning the target address to the interface of the second network 2b of the user device 3; and transmitting the one or more data packets temporarily stored by the routing module 12 to the interface of the second network 2b of the user device 3. The target address is identical to the original used address. The details of the above steps are described later.

Figure 2:
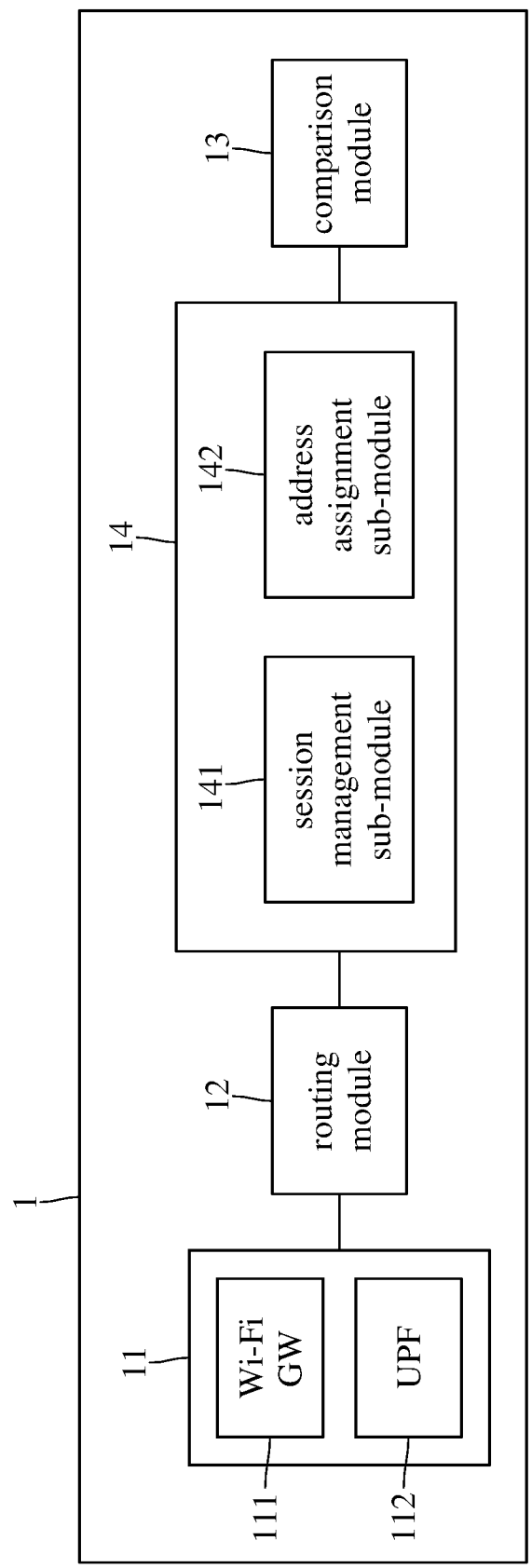
FIG. 2 is a function block diagram of a multi-access edge computing device according to an embodiment of this disclosure.

For a further description of the architecture of the multi-access edge computing device 1, please refer to FIG. 1 and FIG. 2, wherein FIG. 2 is a function block diagram of a multi-access edge computing device according to an embodiment of this disclosure. As shown in FIG. 2, the wireless connection module 11 of the multi-access edge computing device 1 can comprise a Wi-Fi gateway (GW) 111 and a user plan function module (UPF) 112. The multi-access edge computing device 1 can be connected to a Wi-Fi access point (AP) by the Wi-Fi GW 111, and connected to the user device 3 through the Wi-Fi AP. The multi-access edge computing device 1 can be connected to a session management function module (SMF) in a mobile network (especially 5G Core) by the UPF 112, and also connected to the user device 3 through a base station (gNB) by the UPF 112. The user device 3 can be connected to an access management function module (AMF) in the mobile network through the base station. More particularly, the user device 3 can be registered with 5G Core through the AMF, and later, when the user device 3 requests to transmit packets through the mobile network, the SMF can authenticate the identity information of the user device 3 and then establish a protocol data unit session (PDU session).

The control module 14 of the multi-access edge computing device 1 can comprise a session management sub-module (SM) 141 and an address assignment sub-module 142. More particularly, the SM 141 can determine whether an access request signal received from the user device 3 is through the Wi-Fi GW 111 or the UPF 112 of the wireless connection module 11 according to the media access control (MAC) address of the packet of the access request signal, and accordingly determine the network to which the user device 3 intends to be connected. The SM 141 can also send a disconnect signal to instruct the user device 3 to release the IP address on the interface of a specific network. More specifically, the method for releasing the IP address of the user device 3 on the Wi-Fi interface is that the SM 141 instructs the Wi-Fi GW 111 to send a disassociation frame signal to the user device 3, and the method for releasing the IP address of the user device 3 on the 5G interface is that the SM 141 instructs the UPF 112 to send a PDU session release signal to the SMF in the 5G Core. The SM 141 can also transfer the signals generated by the address assignment sub-module 142.

The address assignment sub-module 142 is configured to look up the target IP address corresponding to the user device 3 in the user device identity and address comparison table based on the access request signal of the user device 3, and transmit an access acceptance signal to the SM 141 after obtaining the target IP address corresponding to the user device 3, wherein the access acceptance signal includes the target IP address. The address assignment sub-module 142 can be an application function (AF) sub-module, an authentication authorization accounting (AAA) proxy sub-module or a mobile edge computing AAA (MEC AAA) sub-module. The AF sub-module is used when the SMF of the 5G Core is set to obtain the IP address corresponding to the user device 3 in the 5G Core; the AAA proxy sub-module is used when the SMF of the 5G Core is set to obtain the IP address corresponding to the user device 3 from a data network and an AAA server exists in the network field (data network); the MEC AAA sub-module is used when the SMF of the 5G Core is set to obtain the IP address corresponding to the user device 3 from the data network and there is no AAA server existing in the network field (data network).

The functions of these three sub-modules are further described below. The functions of the AF sub-module include: connecting to the 5G Core, and informing the SMF, through a policy control function (PCF) module in the 5G Core, that the SMF should obtain the IP address corresponding to the user device 3 from an external IP pool; serving as the external IP pool of the SMF; as receiving an access request signal from the Wi-Fi GW 111, asking an authentication server function module (AUSF) in the 5G Core to authenticate the identity information of the user device 3; and generating an access acceptance signal according to the target IP address obtained from the user device identity and address comparison table, and transmitting the access acceptance signal to the SM 141 to assign the target IP address.

The functions of the AAA proxy sub-module include: analyzing the user identity (SUPI) from the access request signal; transferring the access request signal to the AAA server in the network field (data network); and receiving an access acceptance signal from the AAA server in the network field (data network) wherein the access acceptance signal is in response to the access request signal, overwriting the content (e.g. value) of an address field (Framed-IP-Address field) in the access acceptance signal with the target IP address obtained from the user device identity and address comparison table, and then transmitting the modified access acceptance signal to the SM 141 to assign the target IP address.

The functions of the MEC AAA sub-module include: storing the identity (SUPI), authentication parameters or other information of the user device(s) in the network field; generating an access acceptance signal, wherein the content (e.g. value) of a Framed-IP-Address field in the access acceptance signal is the target IP address obtained from the user device identity and address comparison table, and then transmitting the access acceptance signal to the SM 141 to assign the target IP address.

It should be noted that FIG. 2 exemplarily illustrates the control module 14 of the multi-access edge computing device 1 includes one address assignment sub-module 142, but in other embodiments, the control module of the multi-access edge computing device can include two or three address assignment sub-modules that are two or three of the above-mentioned AF sub-module, AAA proxy sub-module and MEC AAA sub-module, and can be selectively enabled based on the usage environment of the multi-access edge computing device. For example, when the usage environment conforms to the timing of using AF sub-module as aforementioned (i.e. when the SMF of the 5G Core is set to obtain the IP address corresponding to the user device 3 in the 5G Core), the AF sub-module is enabled and the other sub-modules are not enabled.

In an embodiment, the multi-access edge computing device 1 can comprise a memory and a processor, wherein the processor is electrically connected to the memory. The memory is, for example, a flash memory, a read-only memory, a magnetic random access memory or other non-volatile storage medium. The memory stores the aforementioned user device identity and address comparison table and multiple instructions, wherein said multiple instructions at least include the instructions corresponding to the operations of the modules of the multi-access edge computing device 1 described in the above embodiments and the network access control method described in the following embodiments.

The processor is, for example, a central processing unit, a microcontroller, a programmable logic controller, etc. The processor can execute the instructions stored in the memory so as to perform the operations of each module. In another embodiment, the modules included in the multi-access edge computing device 1 as aforementioned are servers independently set up and connected to each other, or applications running on one or more servers.

Figure 3:
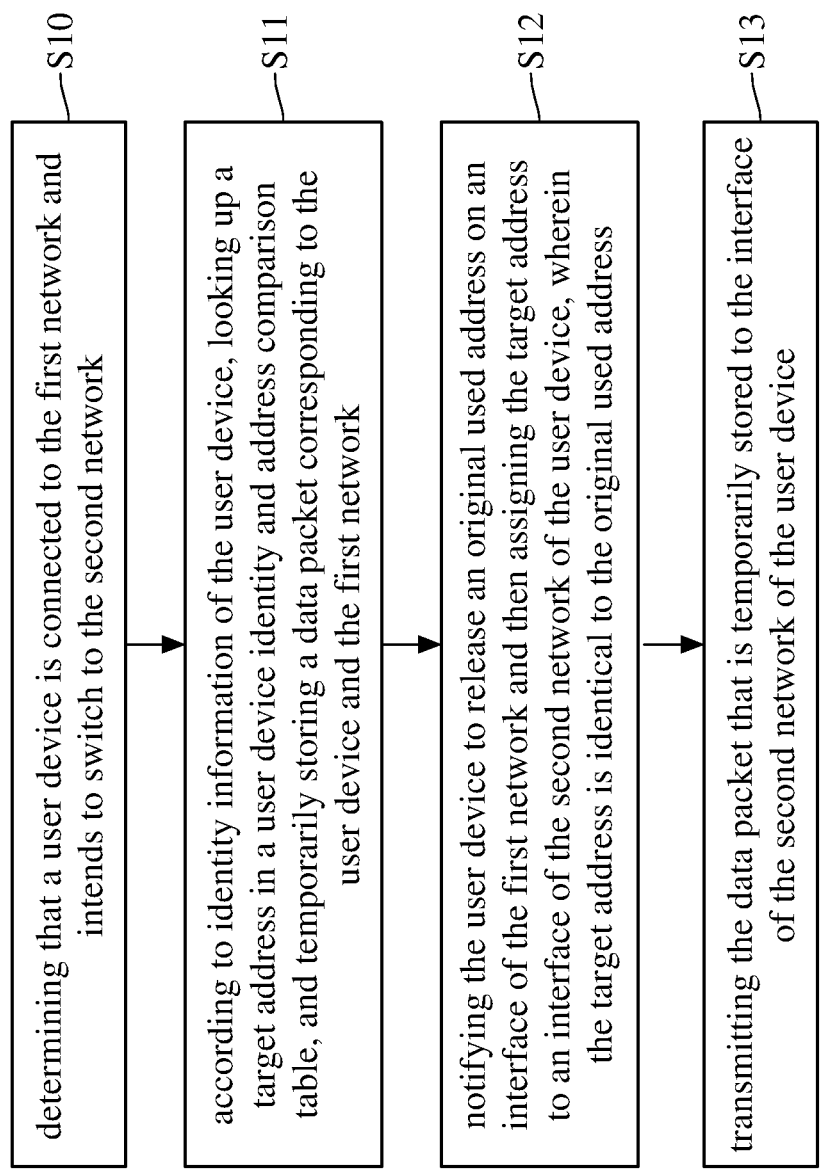
FIG. 3 is a flow chart of a network access control method according to an embodiment of this disclosure.

This disclosure also provides a network access control method applied to a multi-access edge computing device. More particularly, the network access control method can be the method of the multi-access edge computing device 1 connecting the user device 3 to the first network 2a or the second network 2b in the aforementioned embodiment. Please refer to FIG. 1 and FIG. 3, wherein FIG. 3 is a flow chart of a network access control method according to an embodiment of this disclosure. In the following, the network access control method shown in FIG. 3 is exemplarily described using the communication environment of the multi-access edge computing device 1 shown in FIG. 1. As shown in FIG. 3, the network access control method comprises step S10: determining that a user device 3 is connected to the first network 2a and intends to switch to the second network 2b; step S11: according to identity information of the user device 3, looking up a target address in a user device identity and address comparison table, and temporarily storing a data packet corresponding to the user device 3 and the first network 2a; step S12: notifying the user device 3 to release an original used address on an interface of the first network 2a and then assigning the target address to an interface of the second network 2b of the user device 3, wherein the target address is identical to the original used address; step S13: transmitting the data packet that is temporarily stored to the interface of the second network 2b of the user device 3. More particularly, the above-mentioned steps S10, S12 and S13 can be performed by the control module 14 of the multi-access edge computing device 1, and in step S11, the control module 14 of the multi-access edge computing device 1 can send an inquiry about the address corresponding to the identity information of the user device 3 to the comparison module 13, take the response from the comparison module 13 as the target address, and notify the routing module 12 to temporarily store the data packet(s) corresponding to the user device 3 and the first network 2a.

Figure 4:
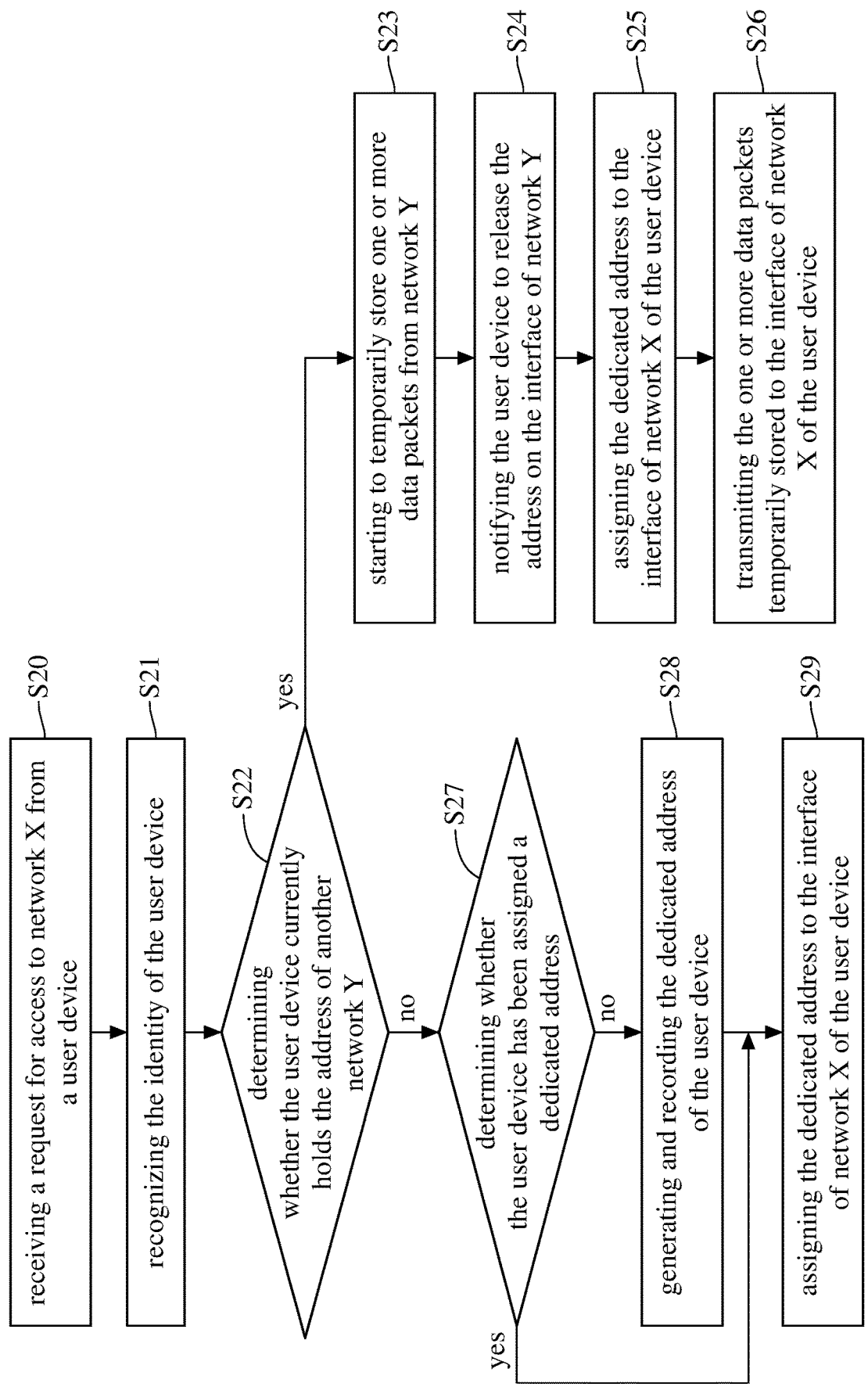
FIG. 4 is a flow chart of a network access control method according to another embodiment of this disclosure.

In addition to the above-mentioned IP address assignment performed as determining that the user device 3 intends to switch the connected network, the network access control method can further comprise the IP address assignment for the situation in which the user device 3 is not connected to any network currently or has not been assigned any IP address. Please refer to FIG. 1, FIG. 2 and FIG. 4, wherein FIG. 4 is a flow chart of a network access control method according to another embodiment of this disclosure. As shown in FIG. 4, the network access control method can comprise step S20: receiving a request for access to network X from user device; step S21: recognizing the identity of the user device; step S22: determining whether the user device currently holds the address of another network Y; when the determined result of step S22 is "yes", performing step S23: starting to temporarily store one or more data packets from network Y; step S24: notifying the user device to release the address on the interface of network Y; step S25: assigning the dedicated address to the interface of network X of the user device; step S26: transmitting the one or more data packets temporarily stored to the interface of network X of the user device; when the determined result of step S22 is "no", performing step S27: determining whether the user device has been assigned a dedicated address; when the determined result of step S27 is "no", performing step S28: generating and recording the dedicated address of the user device; and after step S28 is performed or when the determined result of step S27 is "yes", performing step S29: assigning the dedicated address to the interface of network X of the user device.

In the following the network access control method shown in FIG. 4 is exemplarily described using the communication environment of multi-access edge computing device 1 shown in FIG. 1 and FIG. 2. In step S20, the control module 14 receives a request for access to network X from the user device 3. More particularly, the SM 141 of the control module 14 can determine whether an access request signal received from the user device 3 is through the Wi-Fi GW 111 or the UPF 112 of the wireless connection module 11 according to the MAC address of the packet of the access request signal, and accordingly determine whether network X is Wi-Fi network or a mobile network. In step S21, the control module 14 recognizes the identity of the user device 3. More particularly, after receiving the access request signal from the Wi-Fi GW 111 or the UPF 112, the address assignment sub-module 142 of the control module 14 firstly analyzes the user identity (SUPI) in this signal, and then uses this SUPI to ask an authentication server function module (AUSF) in the 5G Core to authenticate the identity of the user device 3. In step S22, the control module 14 determines whether the user device 3 currently holds the address of another network Y. More particularly, in the control module 14, the address assignment sub-module 142 confirms to the session management sub-module 141 whether the last connected network of the user device 3 is different from the network to be connected. When the determined result of step S22 is "yes", the control module 14 notifies the routing module 12 to start to temporarily store one or more packets from network Y (step S23). More particularly, the control module 14 notifies the routing module 12 by the session management sub-module 141. In steps S24-S26, the control module 14 notifies the user device 3 to release the address on the interface of network Y, assigns the dedicated address to the interface of network X of the user device 3, and then transmits the one or more packets temporarily stored to the interface of network X of the user device 3. More particularly, the control module 14 performs steps S24-S26 by the session management sub-module 141, and the dedicated address is obtained by consulting the user device identity and address comparison table by the address assignment sub-module 142.

In particular, step S10 in FIG. 1 can include steps S20-S22 in FIG. 2, wherein the determined result of step S22 is "yes"; step S11 in FIG. 1 can include step S23 in FIG. 2; step S12 in FIG. 1 can include steps S24 and S25 in FIG. 2; step S13 in FIG. 1 corresponds to step S26 in FIG. 2.

When the determined result of step S22 is "no", which indicates that the user device 3 is not connected to any network at that time, the control module 14 consults the comparison module 13 to instruct the comparison module 13 to determine whether the user device 3 has been assigned a dedicated address according to the identity information of the user device 3 and the user device identity and address comparison table (step S27). When the determined result of step S27 is "no" (e.g. no record about the user device 3 found in the comparison table), the comparison module 13 generates a dedicated address for the user device 3 and records this dedicated address (step S28). More particularly, the comparison module 13 can select an unused IP address from the IP pool as the above-mentioned dedicated address, record this dedicated address, the identity information of the user device 3, and the correspondence between the two in the user device identity and address comparison table, and return the dedicated address to the control module 14. In step S29, the control module 14 assigns the dedicated address to the interface of network X of the user device 3. Moreover, when the determined result of step S27 is "yes" (e.g. the dedicated address of the user device 3 is stored in the comparison table), the comparison module 13 returns the dedicated address of the user device 3 to the control module 14, and then the control module 14 assigns the dedicated address to the interface of network X of the user device 3.

As aforementioned, the address assignment sub-module 142 of the control module 14 of the multi-access edge computing device 1 can include one or more of the AF sub-module, the AAA proxy sub-module and the MEC AAA sub-module which are used at different timings. The following further describes the signal transmission of three embodiments of the network access control method in which the above-mentioned three types of sub-modules respectively participate.

Figure 5A:
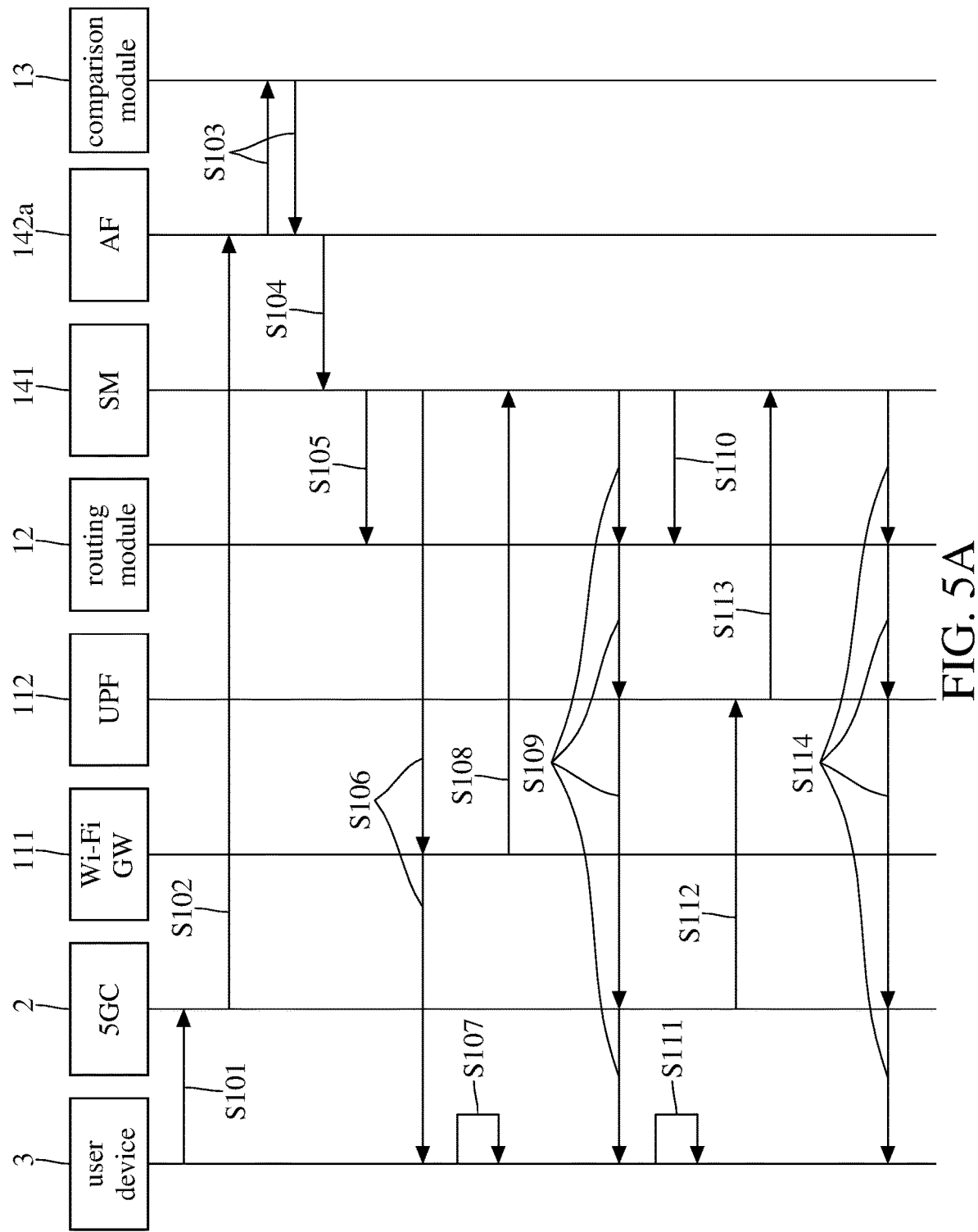
FIGS. 5A and 5B are schematic diagrams of signal transmission of a network access control method according to an embodiment of this disclosure.
Figure 5B:
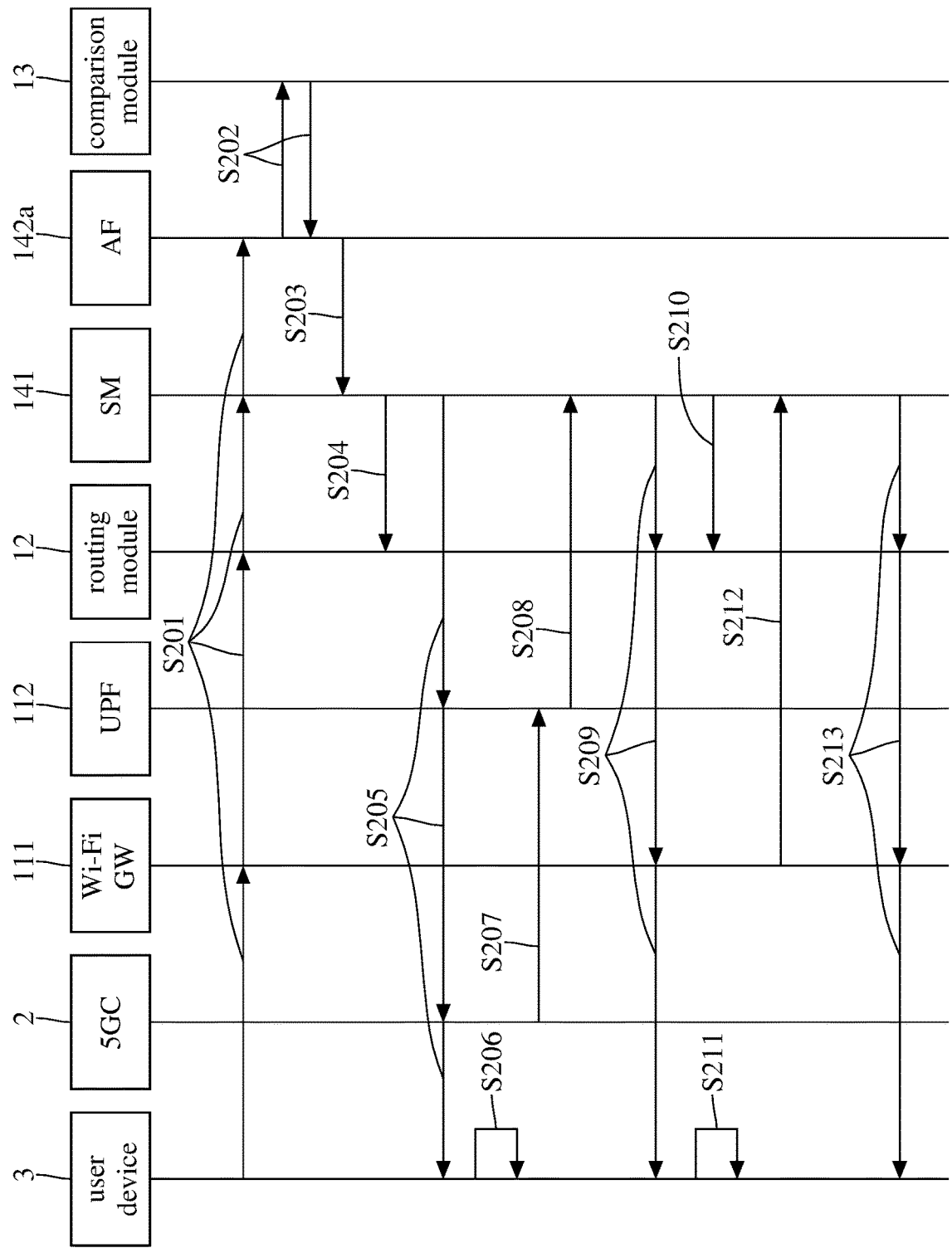

Please refer to FIGS. 5A and 5B, schematic diagrams of signal transmission of a network access control method according to an embodiment of this disclosure. The user device 3, the Wi-Fi GW 111, the UPF 112, the routing module 12, the SM 141 and the comparison module 13 shown in FIGS. 5A and 5B are the same as the modules/sub-modules with the same symbols in FIGS. 1 and 2, and a AF 142a (AF sub-module) serves as the address assignment sub-module in FIG. 2, wherein the functions of each of the modules/sub-modules and the connections therebetween are as described in the aforementioned embodiments, and are not repeated here. 5GC 2 represents the 5G Core, and includes modules such as SMF, AMF, AUSF, PCF, etc. as described in the aforementioned embodiments.

FIG. 5A illustrates the switching process of the user device 3 from the Wi-Fi network to the 5G network. In step S101, the user device 3 requests an IP address of the 5G interface from the 5GC 2. More particularly, the user device 3 can send an access request signal including the identity information of the user device 3 to the 5GC 2. Then, in step S102, the SMF in the 5GC 2 establishes a PDU session according to the request from the user device 3, and requests an IP address for access to the 5G network from the AF 142a (i.e. transmitting the access request signal to the AF 142a). More particularly, before step S101, the AF 142a is set to be an external IP pool of the SMF in the 5GC 2 in advance, and therefore, when the SMF in the 5GC 2 receives the request from the user device 3, the SMF requests an IP address from the AF 142a according to the setting. In step S103, the AF 142a consults the user device identity and address comparison table in the comparison module 13 according to the identity information of the user device 3 included in the access request signal to obtain the target IP address corresponding to the identity information of the user device 3. In step S104, the AF 142a notifies the SM 141 that the user device 3 is about to access the 5G network. More particularly, the AF 142a generates an access acceptance signal including the target IP address and transmits the access acceptance signal to the SM 141.

In step S105, the SM 141 controls the routing module 12 to start to temporarily store data packet(s) according to the access acceptance signal. More particularly, the data packet temporarily stored by the routing module 12 is the data packet that the APP backend originally intends to transmit to the user device 3 through the Wi-Fi network. In step S106, the SM 141 transmits a signal to the Wi-Fi GW 111 to send a disconnect signal to the user device 3 by a management interface of Wi-Fi, wherein the disconnect signal is a disassociation frame signal, which is a standard signal defined by Wi-Fi access technology. In step S107, the user device 3 releases the IP address on the Wi-Fi interface according to the disconnect signal. In step S108, the Wi-Fi GW 111 reports to the SM 141 that the original used IP address on the original network interface is released.

In steps S109 and S110, the SM 141 sends the access acceptance signal to the user device 3 through the routing module 12, the UPF 112 and the 5GC 2 according to the report from the Wi-Fi GW 111, and the SM 141 notifies the routing module 12 to set the route as: the user device 3 accessing the 5G network. In step S111, the user device 3 obtains the target IP address from the access acceptance signal, and accesses the 5G network using the target IP address. In step S112, the base station (gNB) of the 5GC 2 establishes a N3 interface between the gNB and the UPF 112. In steps S113 and S114, the UPF 112 notifies the SM 141 that the N3 interface between the gNB and the UPF 112 is ready, and the SM 141 accordingly controls the routing module 12 to transmit the temporarily stored data packet(s) to the user device 3 through the UPF 112 and the 5GC 2, that is, through the interface of the 5G network.

In particular, step S108 is performed after a specific period of time after step S106 is performed, or step S108 is performed immediately after step S106 is performed and step S109 is performed after a specific period of time after step S108 is performed, so as to confirm that the IP address assignment for the new network interface is performed after the release of the IP address on the original network interface.

FIG. 5B illustrates the switching process of the user device 3 from the 5G network to the Wi-Fi network. In step S201, the user device 3 sends an access request signal including the identity information of the user device 3 to the Wi-Fi GW 111, and the Wi-Fi GW 111 transmits the access request signal to the AF 142a through the routing module 12 and the SM 141 to request an IP address for access to the Wi-Fi network. In step S202, the AF 142a consults the user device identity and address comparison table in the comparison module 13 according to the identity information of the user device 3 included in the access request signal to obtain the target IP address corresponding to the identity information of the user device 3. In step S203, the AF 142a notifies the SM 141 that the user device 3 is about to access the Wi-Fi network. More particularly, the AF 142a generates an access acceptance signal including the target IP address and transmits the access acceptance signal to the SM 141. In particular, the target IP address is contained in the Framed-IP-Address field in the access acceptance signal.

In step S204, the SM 141 controls the routing module 12 to start to temporarily store data packet(s) according to the access acceptance signal. More particularly, the data packet temporarily stored by the routing module 12 is the data packet that the APP backend originally intends to transmit to the user device 3 through the 5G network. In step S205, the SM 141 transmits a signal to the UPF 112 to instruct the UPF 112 to send a disconnect signal through the SMF in the 5GC 2 to the user device 3, wherein the disconnect signal is a PDU session release signal, which is a standard signal defined by 5G access technology. In step S206, the user device 3 releases the IP address on the 5G interface according to the disconnect signal. In steps S207 and S208, the gNB of the 5GC 2 removes the N3 interface between the gNB and the UPF 112, and the UPF 112 notifies the SM 141 that the N3 interface is removed.

In steps S209 and S210, the SM 141 sends the access acceptance signal to the user device 3 through the routing module 12 and the Wi-Fi GW 111 according to the notification from the UPF 112, and the SM 141 notifies the routing module 12 to set the route as: the user device 3 accessing the Wi-Fi network. In step S211, the user device 3 obtains the target IP address from the access acceptance signal, and accesses the Wi-Fi network using the target IP address. In steps S212 and S213, the Wi-Fi GW 111 notifies the SM 141 that the user device 3 is connected to the Wi-Fi network, and the SM 141 accordingly controls the routing module 12 to transmit the temporarily stored data packet(s) to the user device 3 through the Wi-Fi GW 111, that is, through the interface of the Wi-Fi network.

Part of the steps shown in FIGS. 5A and 5B as abovementioned can correspond to the network access control method shown in FIG. 3, that is, the network switching process performed when the user device 3 originally connected to a network intends to switch to another network. More particularly, step S11 in FIG. 3 can correspond to steps S103-S105 in FIG. 5A, or correspond to steps S202-S204 in FIG. 5B; step S12 in FIG. 3 can correspond to steps S106-S113 in FIG. 5A, or correspond to steps S205-S212 in FIG. 5B; step S13 in FIG. 3 can correspond to step S114 in FIG. 5A, or correspond to step S213 in FIG. 5B. Moreover, when the user device 3 is not connected to any network originally and intends to access the 5G network, the signal transmission between the multi-access edge computing device and the user device 3 can merely include steps S101-S104 and steps S109-S112 shown in FIG. 5A, or further include step S113 to notify the SM 141 that the user device 3 accesses the 5G network; when the user device 3 is not connected to any network originally and intends to access the Wi-Fi network, the signal transmission between the multi-access edge computing device and the user device 3 can merely include steps S201-S203 and steps S209-S211 shown in FIG. 5B, or further include step S212 to notify the SM 141 that the user device 3 accesses the Wi-Fi network.

Figure 6A:
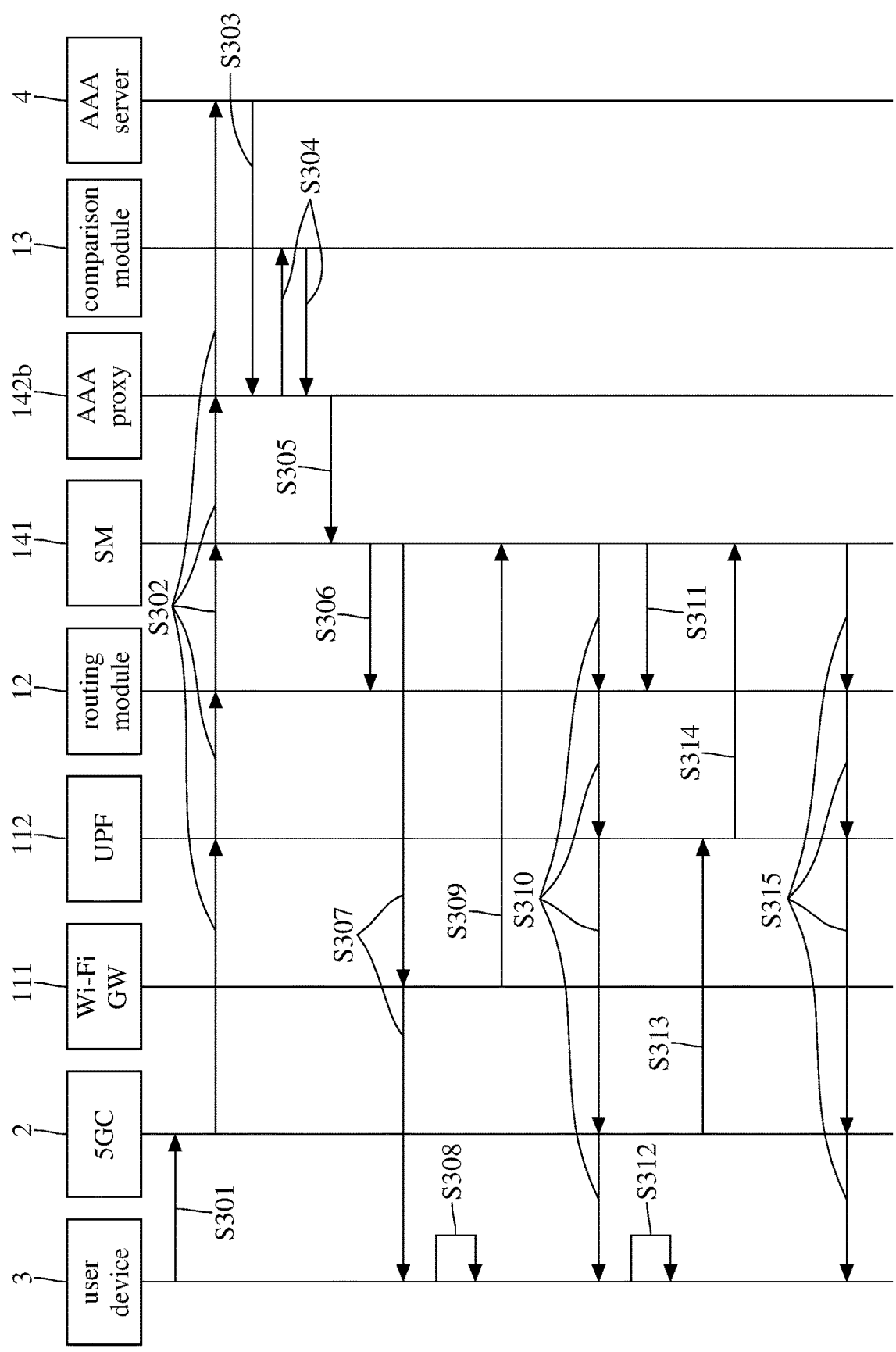
FIGS. 6A and 6B are schematic diagrams of signal transmission of a network access control method according to another embodiment of this disclosure.
Figure 6B:
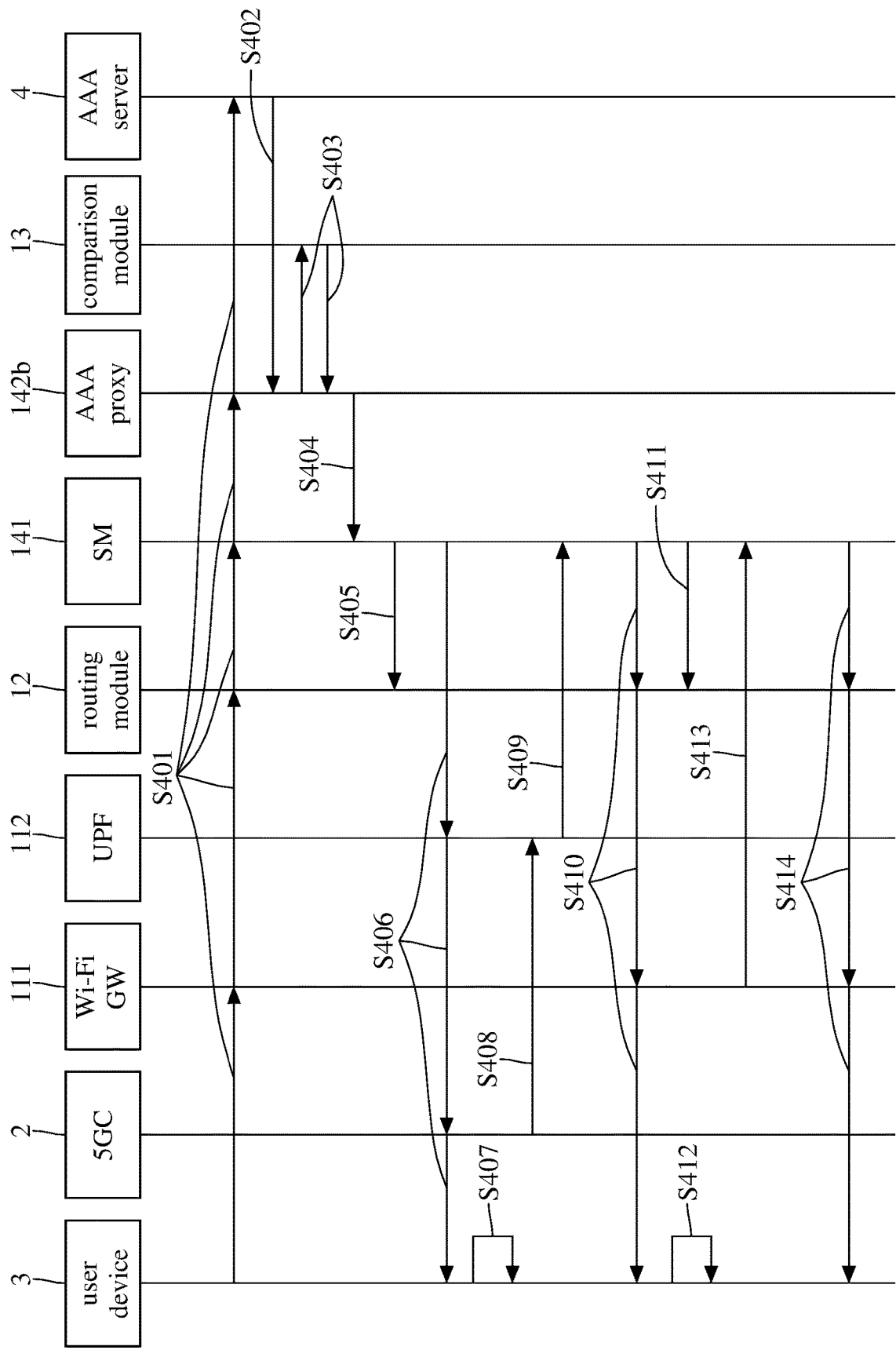

Please refer to FIGS. 6A and 6B, schematic diagrams of signal transmission of a network access control method according to another embodiment of this disclosure. The user device 3, the Wi-Fi GW 111, the UPF 112, the routing module 12, the SM 141 and the comparison module 13 shown in FIGS. 6A and 6B are the same as the modules/sub-modules with the same symbols in FIGS. 1 and 2, and a AAA proxy 142b (AAA proxy sub-module) serves as the address assignment sub-module in FIG. 2, wherein the functions of each of the modules/sub-modules and the connections therebetween are as described in the aforementioned embodiments, and are not repeated here. 5GC 2 represents the 5G Core, and includes modules such as SMF, AMF, AUSF, PCF, etc. as described in the aforementioned embodiments. AAA server 4 represents is an enterprise server located in the data network and configured to provide APP services, and is connected to the AAA proxy 142b.

FIG. 6A illustrates the switching process of the user device 3 from the Wi-Fi network to the 5G network. In step S301, the user device 3 requests an IP address of the 5G interface from the 5GC 2. More particularly, the user device 3 can send an access request signal including the identity information of the user device 3 to the 5GC 2. Then, in step S302, the SMF in the 5GC 2 transmits the access request signal to the AAA server 4 through the UPF 112, the routing module 12, the SM 141 and the AAA proxy 142b. More particularly, before step S301, the SMF in the 5GC 2 is set to obtain an IP address from the data network in advance, and therefore, when the SMF in the 5GC 2 receives the access request signal from the user device 3, the SMF transmits the access request signal to the AAA server 4 in the network field according to the setting. In step S303, the AAA server 4 responds with an access acceptance signal corresponding to the access request signal to the AAA proxy 142*b*. In step S304, the AAA proxy 142*b* consults the user device identity and address comparison table in the comparison module 13 to obtain the target IP address corresponding to the identity information of the user device 3. In step S305, the AAA proxy 142*b* overwrites the content (e.g. value) of the Framed-IP-Address field in the access acceptance signal returned by the AAA server 4 with the target IP address obtained from the comparison table, and transmits the modified access acceptance signal (i.e. the access acceptance signal with the overwritten Framed-IP-Address field) to the SM 141. The subsequent steps S306-S315 for temporarily storing data packet(s), releasing the original used IP address on the interface of the Wi-Fi network, assigning the target IP address to the interface of the 5G network and providing the temporarily stored data packet(s) to the interface of the 5G network have the same details as steps S105-S114 in FIG. 5A have, so the details are not repeated here.

FIG. 6B illustrates the switching process of the user device 3 from the 5G network to the Wi-Fi network. In step S401, the user device 3 sends an access request signal including the identity information of the user device 3 to the Wi-Fi GW 111, the Wi-Fi GW 111 transmits the access request signal to the AAA proxy 142*b* through the routing module 12 and the SM 141, and the AAA proxy 142*b* then transmits the access request signal to the AAA server 4. In step S402, the AAA server 4 returns an access acceptance signal corresponding to the access request signal to the AAA proxy 142*b*. In step S403, the AAA proxy 142*b* consults the user device identity and address comparison table in the comparison module 13 to obtain the target IP address corresponding to the identity information of the user device 3. In step S404, the AAA proxy 142*b* overwrites the content (e.g. value) of the Framed-IP-Address field in the access acceptance signal returned by the AAA server 4 with the target IP address obtained from the comparison table, and transmits the modified access acceptance signal (i.e. the access acceptance signal with the overwritten Framed-IP-Address field) to the SM 141. The subsequent steps S405-S414 for temporarily storing data packet(s), releasing the original used IP address on the interface of the 5G network, assigning the target IP address to the interface of the Wi-Fi network and providing the temporarily stored data packet(s) to the interface of the Wi-Fi network have the same details as steps S204-S213 in FIG. 5B have, so the details are not repeated here.

Part of the steps shown in FIGS. 6A and 6B as abovementioned can correspond to the network access control method shown in FIG. 3, that is, the network switching process performed when the user device 3 originally connected to a network intends to switch to another network. More particularly, step S11 in FIG. 3 can correspond to steps S304, S306 in FIG. 6A, or correspond to steps S403, S405 in FIG. 6B; step S12 in FIG. 3 can correspond to step S307-S314 in FIG. 6A, or correspond to steps S406-S413 in FIG. 6B; step S13 in FIG. 3 can correspond to step S315 in FIG. 6A, or correspond to step S414 in FIG. 6B. In addition, the embodiment shown by FIG. 6A/6B further includes step S303/S402 for obtaining the access acceptance signal including an address field (Framed-IP-Address field) from the AAA server 4 by the AAA proxy 142*b* and step S305/S404 for overwriting the content of the address field with the target IP address obtained from the comparison table.

Moreover, when the user device 3 is not connected to any network originally and intends to access the 5G network, the signal transmission between the multi-access edge computing device and the user device 3 can merely include steps S301-S305 and steps S310-S313 in FIG. 6A, or further include step S314 to notify the SM 141 that the user device 3 accesses the 5G network; when the user device 3 is not connected to any network originally and intends to access the Wi-Fi network, the signal transmission between the multi-access edge computing device and the user device 3 can merely include steps S401-S404 and steps S410-S412 in FIG. 6B, or further include step S413 to notify the SM 141 that the user device 3 access the Wi-Fi network.

Figure 7A:
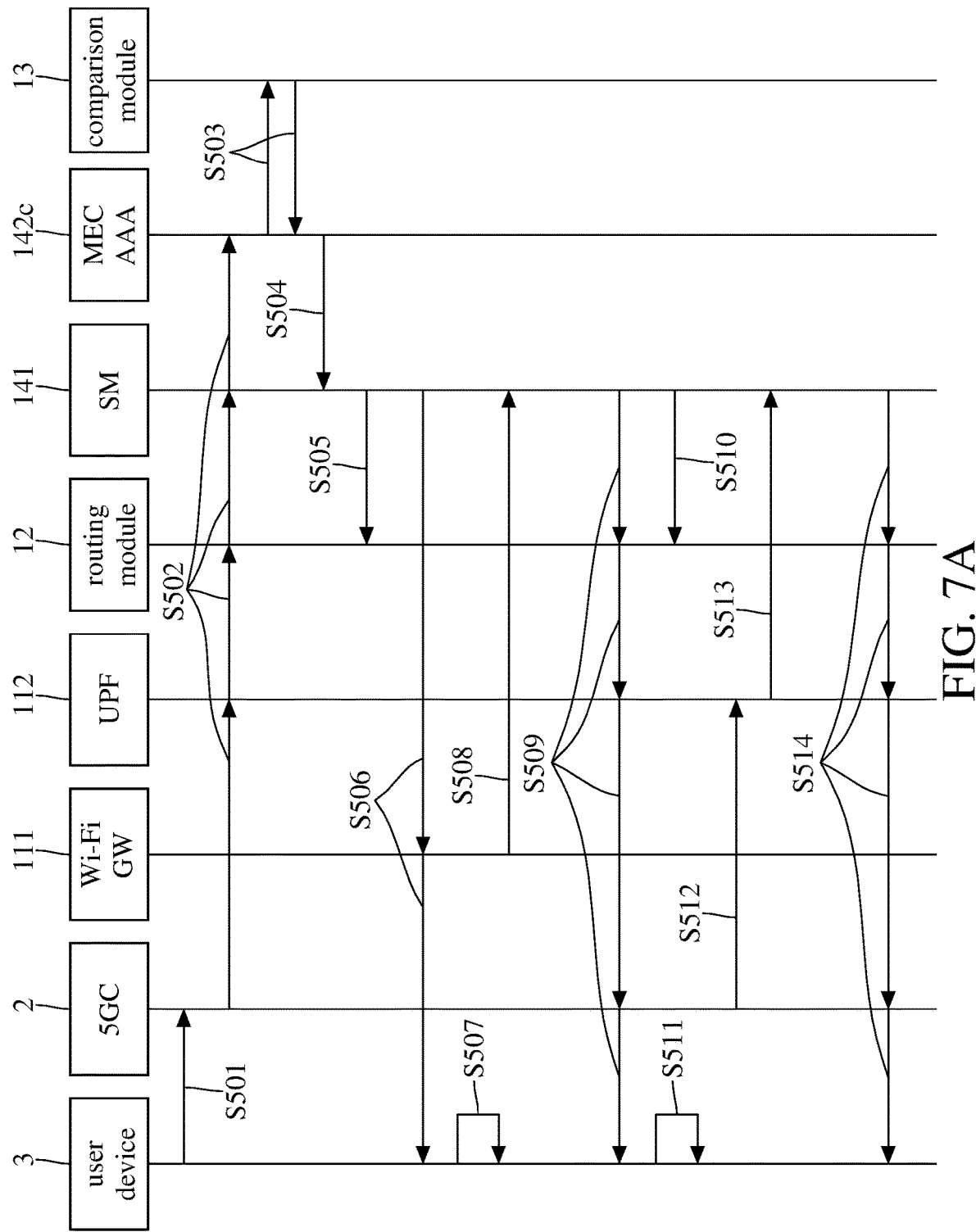
FIGS. 7A and 7B are schematic diagrams of signal transmission of a network access control method according to yet another embodiment of this disclosure.
Figure 7B:
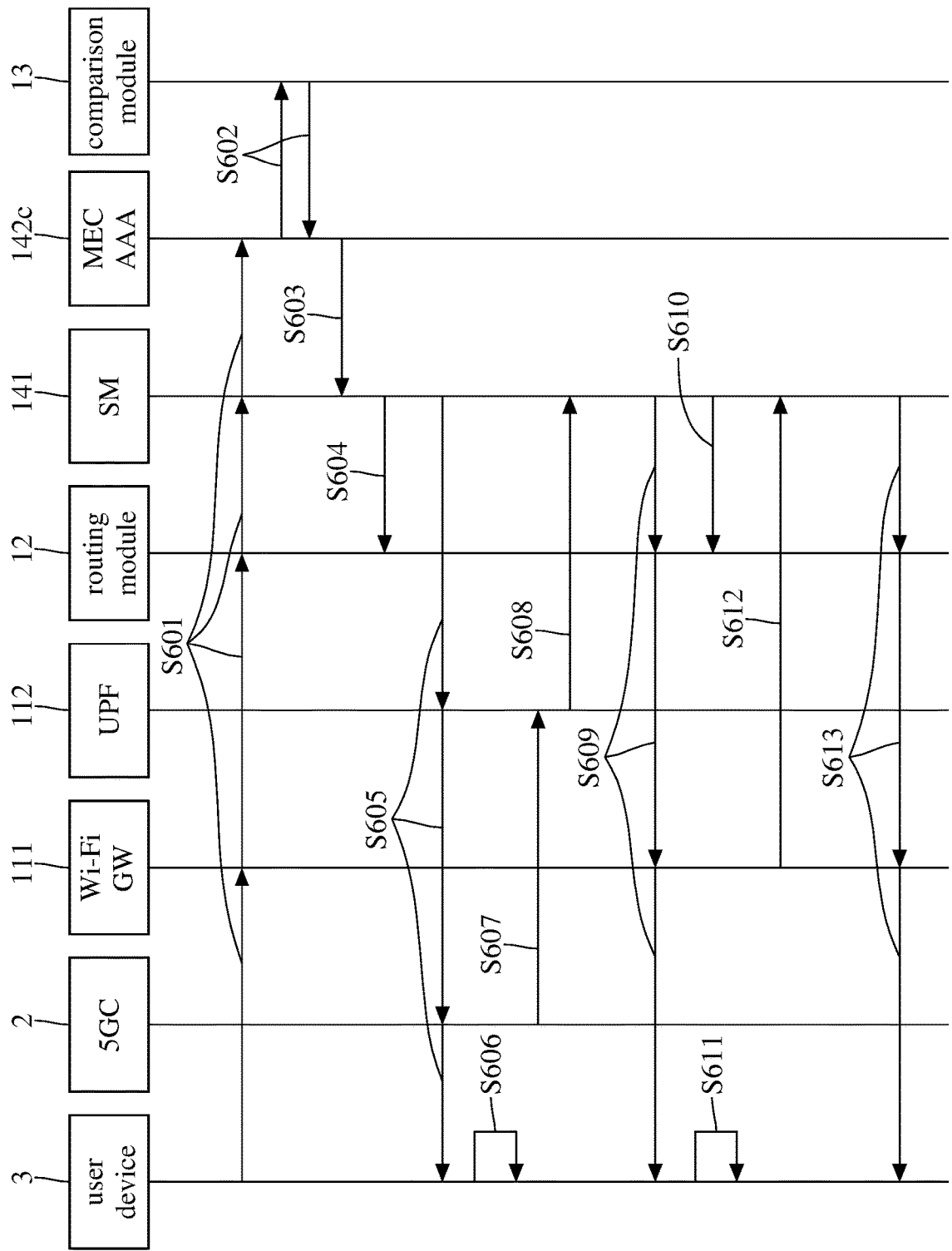

Please refer to FIGS. 7A and 7B, schematic diagrams of signal transmission of a network access control method according to yet another embodiment of this disclosure. FIG. 7A illustrates the switching process of the user device 3 from the Wi-Fi network to the 5G network, and FIG. 7B illustrates the switching process of the user device 3 from the 5G network to the Wi-Fi network. The user device 3, the Wi-Fi GW 111, the UPF 112, the routing module 12, the SM 141 and the comparison module 13 shown in FIGS. 7A and 7B are the same as the modules/sub-modules with the same symbols in FIGS. 1 and 2, and a MEC AAA 142*c* (MEC AAA sub-module) serves as the address assignment sub-module in FIG. 2, wherein the functions of each of the modules/sub-modules and the connections therebetween are as described in the aforementioned embodiments, and are not repeated here. 5GC 2 represents the 5G Core, and includes modules such as SMF, AMF, AUSF, PCF, etc. as described in the aforementioned embodiments.

FIG. 7A illustrates the switching process of the user device 3 from the Wi-Fi network to the 5G network. In step S501, the user device 3 requests an IP address of the 5G interface from the 5GC 2. More particularly, the user device 3 can send an access request signal including the identity information of the user device 3 to the 5GC 2. Then, in step S502, the SMF in the 5GC 2 transmits the access request signal to the MEC AAA 142*c* through the UPF 112, the routing module 12 and the SM 141. More particularly, before step S501, the SMF in the 5GC 2 is set to obtain an IP address from the data network in advance, and the MEC AAA 142*c* serves as an AAA server in the data network since there is no AAA server existing in the network field. When the SMF in the 5GC 2 receives the access request signal from the user device 3, the SMF transmits the access request signal to the MEC AAA 142*c* according to the setting. In step S503, the MEC AAA 142*c* consults the user device identity and address comparison table in the comparison module 13 to obtain the target IP address corresponding to the identity information of the user device 3. In step S504, the MEC AAA 142*c* generates an access acceptance signal including the target IP address, and transmits the access acceptance signal to the SM 141. The subsequent steps S505-S514 for temporarily storing data packet(s), releasing the original used IP address on the interface of the Wi-Fi network, assigning the target IP address to the interface of the 5G network and providing the temporarily stored data packet(s) to the interface of the 5G network have the same details as steps S105-S114 in FIG. 5A have, so the details are not repeated here.

FIG. 7B illustrates the switching process of the user device 3 from the 5G network to the Wi-Fi network. In step S601, the user device 3 sends an access request signal including the identity information of the user device 3 to the Wi-Fi GW 111, the Wi-Fi GW 111 transmits the access request signal to the MEC AAA 142c through the routing module 12 and the SM 141. In step S602, the MEC AAA 142c consults the user device identity and address comparison table in the comparison module 13 to obtain the target IP address corresponding to the identity information of the user device 3. In step S603, the MEC AAA 142c generates an access acceptance signal including the target IP address, and transmits the access acceptance signal to the SM 141. The subsequent steps S604-S613 for temporarily storing data packet(s), releasing the original used IP address on the interface of the 5G network, assigning the target IP address to the interface of the Wi-Fi network and providing the temporarily stored data packet(s) to the interface of the Wi-Fi network have the same details as steps S204-S213 in FIG. 5B have, so the details are not repeated here.

Part of the steps shown in FIGS. 7A and 7B as abovementioned can correspond to the network access control method shown in FIG. 3, that is, the network switching process performed when the user device 3 originally connected to a network intends to switch to another network. More particularly, step S11 in FIG. 3 can correspond to steps S503-S505 in FIG. 7A, or correspond to steps S602-S604 in FIG. 7B; step S12 in FIG. 3 can correspond to steps S506-S513 in FIG. 7A, or correspond to steps S605-S612 in FIG. 7B; step S13 in FIG. 3 can correspond to step S514 in FIG. 7A, or correspond to step S613 in FIG. 7B. Moreover, when the user device 3 is not connected to any network originally and intends to access the 5G network, the signal transmission between the multi-access edge computing device and the user device 3 can merely include step S501-S504 and steps S509-S512 shown in FIG. 7A, or further include step S513 to notify the SM 141 that the user device 3 accesses the 5G network; when the user device 3 is not connected to any network originally and intends to access the Wi-Fi network, the signal transmission between the multi-access edge computing device and the user device 3 can merely include steps S601-S603 and steps S609-S611 shown in FIG. 7B, or further include step S612 to notify the SM 141 that the user device 3 accesses the Wi-Fi network.

In particular, the communications between the multi-access edge computing device and the user device 3 through the 5G network/Wi-Fi network as shown in FIGS. 4A-7B can all use standard signals. Therefore, during the operation of the network access control method of the multi-access edge computing device provided in this disclosure, there may be no need to modify the network system architecture, no need to install a specific communication module in the user device, and no need to apply virtual private network (VPN) technology to the user device.

In view of the above, the multi-access edge computing device and the network access control method provided in this disclosure can allow a user device to always hold the same IP address as it needs to switch the connected network due to movement, thereby avoiding service connection interruption. Moreover, by releasing the IP address on the original network interface of the user device and temporarily storing data packets before the handover, and assigning the same IP address to the target network interface after the handover, the multi-access edge computing device and the network access control method provided in this disclosure may avoid the loss of data packets.

What is claimed is:

1. A multi-access edge computing device, configured to be connected to a first network and a second network that have different radio access technologies, comprising:

a routing module configured to temporarily store a data packet; a comparison module storing a user device identity and address comparison table; and a control module connected to the routing module and the comparison module, and configured to perform steps when determining that a user device is connected to the first network and intends to switch to the second network, wherein the steps comprise: according to identity information of the user device, looking up a target address in the user device identity and address comparison table, and notifying the routing module to temporarily store a data packet corresponding to the user device and the first network;

notifying the user device to release an original used address on an interface of the first network and then assigning the target address to an interface of the second network of the user device, wherein the target address is identical to the original used address; and transmitting the data packet that is temporarily stored to the interface of the second network of the user devices wherein the control module is further configured to use the identity information of the user device to send an inquiry about a dedicated address to the comparison module and assign the dedicated address to the interface of the second network of the user device when determining that the user device intends to be connected to the second network and is not currently connected to any network, and wherein as receiving the inquiry from the comparison module, the comparison module is configured to determine whether the user device has been assigned the dedicated address according to the identity information of the user device and the user device identity and address comparison table, if yes, returning the dedicated address to the control module, and if no, generating the dedicated address based on an IP pool, recording the dedicated address and the identity information of the user device in the user device identity and address comparison table, and returning the dedicated address to the control module.

2. The multi-access edge computing device according to claim 1, wherein notifying the user device to release the original used address on the interface of the first network performed by the control module comprises: when the first network is Wi-Fi network, sending a disassociation frame signal to the user device.

3. The multi-access edge computing device according to claim 1, wherein notifying the user device to release the original used address on the interface of the first network performed by the control module comprises: when the first network is a mobile network, sending a protocol data unit session release signal to the user device.

4. The multi-access edge computing device according to claim 1, wherein one of the first network and the second network is a mobile network, and when a session management function module of the mobile network is set to obtain a user device address from a data network and an authentication authorization accounting (AAA) server exists in the data network, the control module is further configured to obtain a signal including an address field from the AAA server and overwrite content of the address field with the target address, and the control module assigns the target address to the interface of the second network of the user device by transmitting the signal including the address field to the interface of the second network of the user device.

5. The multi-access edge computing device according to claim 1, wherein determining that the user device is connected to the first network and intends to switch to the second network performed by the control module comprises: receiving a request for access to the second network from the user device; recognizing the identity information of the user device; and determining that the user device currently holds the original used address of the first network.

6. The multi-access edge computing device according to claim 1, wherein as determining that an available capacity of the user device identity and address comparison table is less than a preset threshold, the comparison module is configured to clear fields corresponding to identity information and another dedicated address of another user device that has not been connected to any radio access technology for a preset time in the user device identity and address comparison table.

7. A network access control method, applied to a multi-access edge computing device configured to be connected to a first network and a second network that have different radio access technologies, and the network access control method comprising:
- determining that a user device is connected to the first network and intends to switch to the second network; according to identity information of the user device, looking up a target address in a user device identity and address comparison table, and temporarily storing a data packet corresponding to the user device and the first network;
- notifying the user device to release an original used address on an interface of the first network and then assigning the target address to an interface of the second network of the user device, wherein the target address is identical to the original used address; and transmitting the data packet that is temporarily stored to the interface of the second network of the user device,
- wherein the method further comprises when determining that another user device intends to be connected to the second network and is not currently connected to any network, using identity information of the another user device to obtain a dedicated address, and assigning the dedicated address to an interface of the second network of the another user device, and wherein using the identity information of the another user device to obtain the dedicated address comprises:
- determining whether the another user device has been assigned the dedicated address according to the identity information of the another user device and the user device identity and address comparison table;

if yes, obtaining the dedicated address; and if no, generating the dedicated address based on an IP pool, and recording the dedicated address and the identity information of the user device in the user device identity and address comparison table.

8. The network access control method according to claim 7, wherein notifying the user device to release the original used address on the interface of the first network comprises: when the first network is Wi-Fi network, sending a disassociation frame signal to the user device.

9. The network access control method according to claim 7, wherein notifying the user device to release the original used address on the interface of the first network comprises: when the first network is a mobile network, sending a protocol data unit session release signal to the user device.

10. The network access control method according to claim 7, wherein one of the first network and the second network is a mobile network, and when a session management function module of the mobile network is set to obtain a user device address from a data network and an AAA server exists in the data network, the network access control method further comprises: obtaining a signal including an address field from the AAA server; and overwriting content of the address field with the target address; wherein assigning the target address to the interface of the second network of the user device comprises transmitting the signal including the address field to the interface of the second network of the user device.

11. The network access control method according to claim 7, wherein determining that the user device is connected to the first network and intends to switch to the second network comprising: receiving a request for access to the second network from the user device; recognizing the identity information of the user device; and determining that the user device currently holds the original used address of the first network.

12. The network access control method according to claim 7, further comprising when an available capacity of the user device identity and address comparison table is less than a preset threshold, clearing fields corresponding to identity information and another dedicated address of another user device that has not been connected to any radio access technology for a preset time in the user device identity and address comparison table.

* * * * *